US012770369B2

(12) United States Patent
Dai et al.

(10) Patent No.: US 12,770,369 B2
(45) Date of Patent: Oct. 20, 2026

(54) RECOGNIZER TRAINING APPARATUS, RECOGNITION DEVICE, ELECTRONIC DEVICE, AND TRAINING METHOD

(71) Applicant: KYOCERA Corporation, Kyoto (JP)

(72) Inventors: Xiaoyan Dai, Yokohama (JP); Hiroki Tanimoto, Yokohama (JP); Jaechul Kim, Misato (JP); Yisan Hsieh, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 271 days.

(21) Appl. No.: 18/568,707

(22) PCT Filed: Jun. 9, 2022

(86) PCT No.: PCT/JP2022/023351
§ 371 (c)(1),
(2) Date: Dec. 8, 2023

(87) PCT Pub. No.: WO2022/260142
PCT Pub. Date: Dec. 15, 2022

(65) Prior Publication Data

US 2024/0290073 A1 Aug. 29, 2024

(30) Foreign Application Priority Data

Jun. 9, 2021 (JP) ................................. 2021-096737
Aug. 27, 2021 (JP) ................................. 2021-139422

(51) Int. Cl.
*G06K 9/00* (2022.01)
*G06V 10/764* (2022.01)

(52) U.S. Cl.
CPC .................................. *G06V 10/764* (2022.01)

(58) Field of Classification Search
CPC .. G06F 18/24323; G06N 20/20; G06N 3/045; G06N 3/09; G06V 10/764
See application file for complete search history.

(56) References Cited

U.S. PATENT DOCUMENTS 9,098,775 B2 8/2015 Matsunaga et al.
10,949,610 B2 3/2021 Odate et al.
(Continued)

FOREIGN PATENT DOCUMENTS

JP H076149 A 1/1995
JP 2013-250809 A 12/2013
(Continued)

OTHER PUBLICATIONS

Bendale, Abhijit, and Terrance Boult. "Towards open world recognition." Proceedings of the IEEE conference on computer vision and pattern recognition. 2015. (Year: 2015).*
(Continued)

*Primary Examiner* — Hadi Akhavannik
(74) *Attorney, Agent, or Firm* — Studebaker Brackett PLLC

(57) ABSTRACT

An information processing apparatus includes a communicator and a controller. The communicator obtains an image. The controller trains a first object recognizer. The first object recognizer consists of a plurality of stepwise determiners in a multilayer structure. A top-layer determiner classifies a target in the image into one of categories. A lower-layer determiner classifies the target in a category determined by a stepwise determiner in a higher layer into a lower category. The first object recognizer recognizes the target by classifying the target stepwise from a higher layer to a lower layer. The controller causes the stepwise determiners to classify the target in the image obtained by the communicator from a higher layer to a lower layer. The controller trains the first object recognizer by adding a new lower category to a higher category corresponding to a lower-layer determiner that cannot classify the target into an existing lower category.

8 Claims, 12 Drawing Sheets

(56) References Cited

U.S. PATENT DOCUMENTS

| | | | | |
|---|---|---|---|---|
| 2012/0287304 | A1 | 11/2012 | Kutaragi et al. | |
| 2016/0078320 | A1* | 3/2016 | Hwang | G06F 18/217 382/159 |
| 2016/0117587 | A1* | 4/2016 | Yan | G06N 3/0464 706/20 |
| 2020/0192872 | A1* | 6/2020 | Quinn | G06F 16/24568 |

FOREIGN PATENT DOCUMENTS

| | | | |
|---|---|---|---|
| JP | 2019-159898 | A | 9/2019 |
| JP | 2020-021378 | A | 2/2020 |
| JP | 2020052935 | A | 4/2020 |
| JP | 2021061804 | A | 4/2021 |
| WO | 2011081192 | A1 | 7/2011 |

OTHER PUBLICATIONS

Roy, Deboleena, Priyadarshini Panda, and Kaushik Roy. "Tree-CNN: a hierarchical deep convolutional neural network for incremental learning." Neural networks 121 (2020): 148-160. (Year: 2020).*

Jeahong Yoon et al., "Lifelong Learning with Dynamically Expandable Networks", arXiv, v11, Jun. 11, 2018, <https://doi.org/10.48550/arXiv.1708.01547>, pp. 1-11.

* cited by examiner

RECOGNIZER TRAINING APPARATUS, RECOGNITION DEVICE, ELECTRONIC DEVICE, AND TRAINING METHOD

CROSS-REFERENCE TO RELATED APPLICATIONS

The present application claims priority to Japanese Patent Application No. 2021-096737 and Japanese Patent Application No. 2021-139422, filed Jun. 9, 2021 and Aug. 27, 2021, respectively, and the contents of these applications are incorporated herein by reference in their entirety.

TECHNICAL FIELD

The present disclosure relates to a recognizer training apparatus, a recognition device, an electronic device, and a training method.

BACKGROUND OF INVENTION

During these years, techniques for recognizing objects included in images through machine learning are being developed.

Patent Literature 1, for example, describes a recognition method where general object recognition and particular object recognition are combined together.

CITATION LIST

Patent Literature

Patent Literature 1: International Publication No. 2011/081192

SUMMARY

In a first aspect, a recognizer training apparatus includes an obtainer and a controller. The obtainer obtains an image. The controller trains a first object recognizer which consists of a plurality of stepwise determiners in a multilayer structure including a top-layer determiner and at least one lower-layer determiner and which recognizes a target in a captured image by classifying the target stepwise from a higher layer to a lower layer, the top-layer determiner classifying the target into one of categories, the at least one lower-layer determiner classifying the target in a category determined by a stepwise determiner in a higher layer into a lower category. The controller trains the first object recognizer by causing the stepwise determiners to classify a target in the image obtained by the obtainer from a higher layer to a lower layer and adding a new lower category to a higher category corresponding to a lower-layer determiner that cannot classify the target into an existing lower category.

In a second aspect, a recognizer training apparatus includes an obtainer and a controller. The obtainer obtains an image including a target. The controller constructs, if a first object recognizer capable of recognizing a learned target cannot recognize the target, a second object recognizer capable of recognizing the target using the target.

In a third aspect, a recognition device includes an obtainer, a storage, and a controller. The obtainer obtains a captured image. The storage stores parameters for constructing the first object recognizer and the second object recognizer obtained from a recognizer training apparatus including an obtainer that obtains an image and a controller that trains a first object recognizer which consists of a plurality of stepwise determiners in a multilayer structure including a top-layer determiner and at least one lower-layer determiner and which recognizes a target in a captured image by classifying the target stepwise from a higher layer to a lower layer, the top-layer determiner classifying the target into one of categories, the at least one lower-layer determiner classifying the target in a category determined by a stepwise determiner in a higher layer into a lower category, the controller training the first object recognizer by causing the stepwise determiners to classify a target in the image obtained by the obtainer from a higher layer to a lower layer and adding a new lower category to a higher category corresponding to a lower-layer determiner that cannot classify the target into an existing lower category, the controller training the first object recognizer if the target is similar to a learned target that can be recognized by the first object recognizer or, if the target is not similar to the learned target, constructing a second object recognizer capable of recognizing the target using the target without using the learned target. The controller recognizes a target included in the image using the first object recognizer and, if the first recognizer cannot recognize the target, recognizes the target using the second object recognizer.

In a fourth aspect, a recognition device includes an obtainer, a storage, and a controller. The obtainer obtains a captured image. The storage stores parameters for constructing the first object recognizer and the second object recognizer obtained from a recognizer training apparatus including an obtainer that obtains an image and a controller that trains a first object recognizer which consists of a plurality of stepwise determiners in a multilayer structure including a top-layer determiner and at least one lower-layer determiner and which recognizes a target in a captured image by classifying the target stepwise from a higher layer to a lower layer, the top-layer determiner classifying the target into one of categories, the at least one lower-layer determiner classifying the target in a category determined by a stepwise determiner in a higher layer into a lower category, the controller training the first object recognizer by causing the stepwise determiners to classify a target in the image obtained by the obtainer from a higher layer to a lower layer and adding a new lower category to a higher category corresponding to a lower-layer determiner that cannot classify the target into an existing lower category, the controller training the first object recognizer if the target is similar to a learned target that can be recognized by the first object recognizer or, if the target is not similar to the learned target, constructing a second object recognizer capable of recognizing the target using the target without using the learned target. The controller recognizes a target included in the image using both the first object recognizer and the second object recognizer and employs a result of the recognition performed by the first object recognizer or the second object recognizer on a basis of degrees of reliability calculated for the recognition.

In a fifth aspect, a recognition device includes an obtainer, a storage, and a controller. The obtainer obtains a captured image. The storage stores parameters for constructing the first object recognizer and the second object recognizer obtained from a recognizer training apparatus including an obtainer that obtains an image and a controller that trains a first object recognizer which consists of a plurality of stepwise determiners in a multilayer structure including a top-layer determiner and at least one lower-layer determiner and which recognizes a target in a captured image by classifying the target stepwise from a higher layer to a lower layer, the top-layer determiner classifying the target into one of categories, the at least one lower-layer determiner classifying the target in a category determined by a stepwise determiner in a higher layer into a lower category, the controller training the first object recognizer by causing the stepwise determiners to classify a target in the image obtained by the obtainer from a higher layer to a lower layer and adding a new lower category to a higher category corresponding to a lower-layer determiner that cannot classify the target into an existing lower category, the controller training the first object recognizer if the target is similar to a learned target that can be recognized by the first object recognizer or, if the target is not similar to the learned target, constructing a second object recognizer capable of recognizing the target using the target without using the learned target, the controller updating the first object recognizer by retraining the first object recognizer using the target that can be recognized by the second object recognizer and the learned target. The controller recognizes a target included in the image using the first object recognizer before the update and the second object recognizer and, after the updated first object recognizer is obtained, recognizes the target using only the first object recognizer.

In a sixth aspect, an electronic device includes an imager, a storage, and a communicator. The imager generates an image by capturing the image. The storage stores parameters for constructing the first object recognizer which obtains the image captured by the imager from a recognizer training apparatus including an obtainer that obtains an image and a controller that trains a first object recognizer which consists of a plurality of stepwise determiners in a multilayer structure including a top-layer determiner and at least one lower-layer determiner and which recognizes a target in a captured image by classifying the target stepwise from a higher layer to a lower layer, the top-layer determiner classifying the target into one of categories, the at least one lower-layer determiner classifying the target in a category determined by a stepwise determiner in a higher layer into a lower category, the controller training the first object recognizer by causing the stepwise determiners to classify a target in the image obtained by the obtainer from a higher layer to a lower layer and adding a new lower category to a higher category corresponding to a lower-layer determiner that cannot classify the target into an existing lower category. The communicator transmits a target included in the image to a recognition device including a controller which performs recognition using the first object recognizer and receives a result of the recognition of the image from the recognition device.

In a seventh aspect, an electronic device includes an imager, a storage, and a communicator. The imager generates an image by capturing the image. The storage stores parameters for constructing the first object recognizer and the second object recognizer which obtain the image captured by the imager from a recognizer training apparatus including an obtainer that obtains an image and a controller that trains a first object recognizer which consists of a plurality of stepwise determiners in a multilayer structure including a top-layer determiner and at least one lower-layer determiner and which recognizes a target in a captured image by classifying the target stepwise from a higher layer to a lower layer, the top-layer determiner classifying the target into one of categories, the at least one lower-layer determiner classifying the target in a category determined by a stepwise determiner in a higher layer into a lower category, the controller training the first object recognizer by causing the stepwise determiners to classify a target in the image obtained by the obtainer from a higher layer to a lower layer and adding a new lower category to a higher category corresponding to a lower-layer determiner that cannot classify the target into an existing lower category, the controller training the first object recognizer if the target is similar to a learned target that can be recognized by the first object recognizer or, if the target is not similar to the learned target, constructing a second object recognizer capable of recognizing the target using the target without using the learned target. The communicator transmits a target included in the image to a recognition device including a controller which recognizes the target included in the image and which, if the first object recognizer cannot recognize the target, recognizes the target using the second object recognizer and receives a result of the recognition of the image from the recognition device.

In an eighth aspect, a training method includes the steps of obtaining an image and training a plurality of stepwise determiners in a multilayer structure including a top-layer determiner and at least one lower-layer determiner, causing the stepwise determiners to classify a target in a captured image by classifying the target stepwise from a higher layer to a lower layer, and adding a new lower category to a higher category corresponding to a lower-layer determiner that cannot classify the target into an existing lower category, the top-layer determiner classifying the target into one of categories, the at least one lower-layer determiner classifying the target in a category determined by a stepwise determiner in a higher layer into a lower category In a ninth aspect, a training method includes the steps of obtaining an image and constructing, if a first object recognition model capable of recognizing a learned target cannot recognize a target in the image, a second object recognizer capable of recognizing the target using the target without using the learned target.

DESCRIPTION OF EMBODIMENTS

Figure 1:
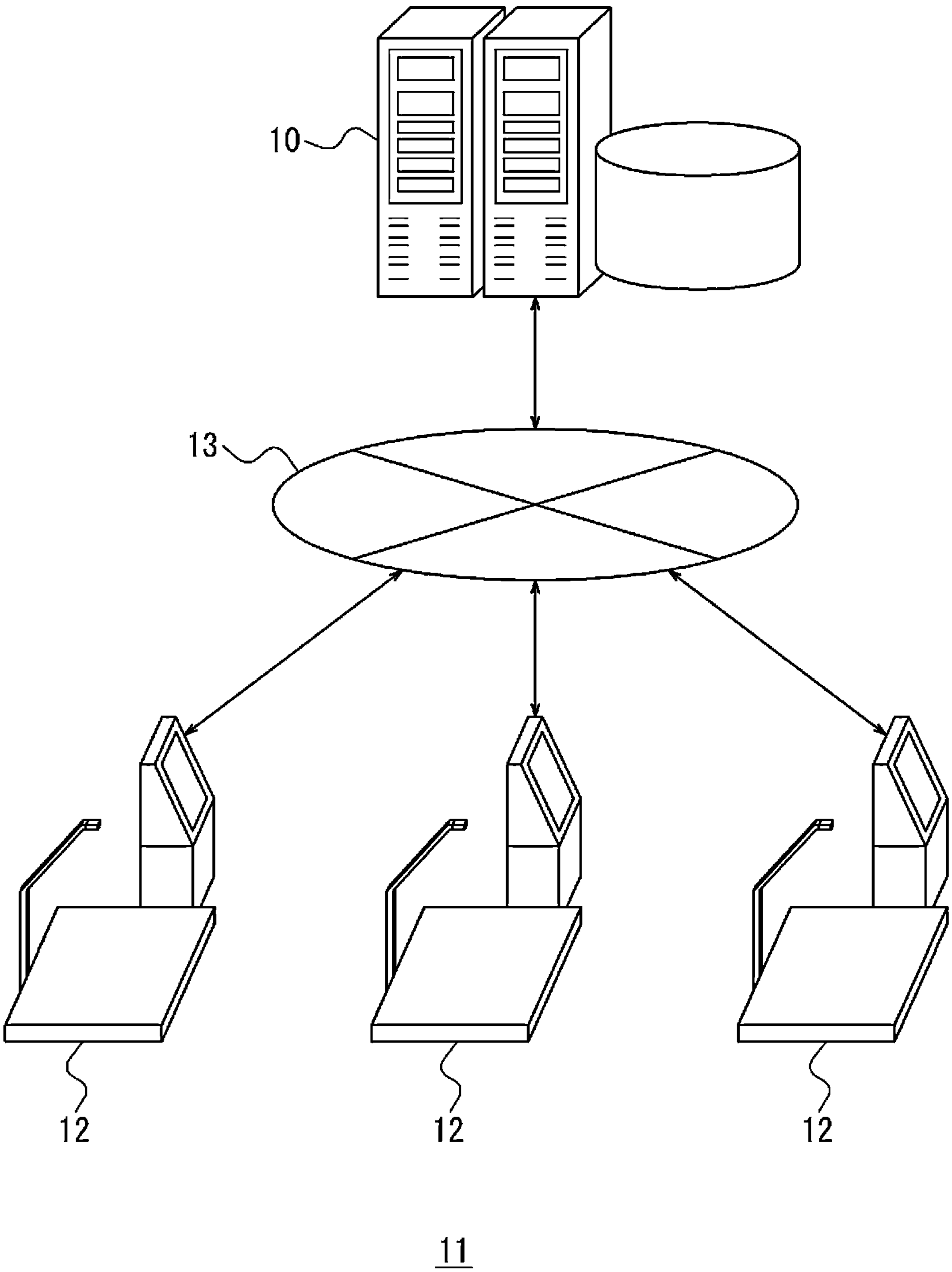
FIG. 1 is a configuration diagram illustrating a schematic configuration of an information processing system including an information processing apparatus 10 that functions as a recognizer training apparatus according to a first embodiment.

Embodiments of the present disclosure will be described hereinafter with reference to the drawings. In the following diagrams, the same components will be given the same reference numerals.

As illustrated in FIG. 1, an information processing system 11 including an information processing apparatus 10 that functions as a recognizer training apparatus according to a first embodiment of the present disclosure includes at least one terminal apparatus 12, a network 13, and the information processing apparatus 10. In the present embodiment, the information processing system 11 includes a plurality of terminal apparatuses 12. The terminal apparatuses 12 and the information processing apparatus 10 may communicate with each other over the network 13.

The information processing system 11 is applied to any system that identifies detection targets on the basis of images of the detection targets included in images. For example, the information processing system 11 is applied to a payment system that identifies products as the detection targets on the basis of images. The information processing system 11 will be described hereinafter using an example where the information processing system 11 is applied to a payment system.

Each the terminal apparatus 12 may capture images of products disposed by a buyer thereon. The terminal apparatus 12 may perform object recognition on the captured images to estimate products in a store corresponding to objects included in the images. The objects in the images refer to objects drawn in the images. The information processing apparatus 10 may calculate an amount demanded on the basis of results of the estimation of all the products whose images have been captured by the terminal apparatus 12. The information processing apparatus 10 may notify the terminal apparatus 12 of the amount demanded. The terminal apparatus 12 may present the amount demanded to the buyer and request the buyer to pay the amount.

The information processing system 11 performs object recognition using at least a first object recognizer or a second object recognizer constructed by performing machine learning using images of products to which product names are attached as annotation data.

The information processing apparatus 10 that functions as a recognizer training apparatus trains the first object recognizer or the second object recognizer with products that have not been learned. Details of the information processing apparatus 10 and the terminal apparatuses 12 will be described hereinafter.

Figure 2:
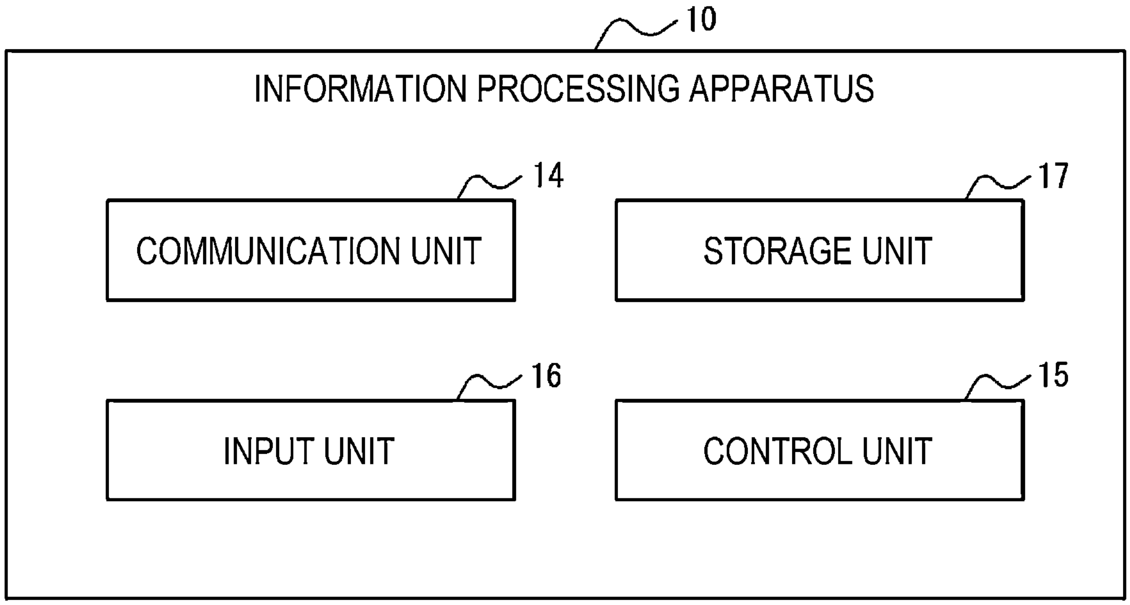
FIG. 2 is a block diagram illustrating a schematic configuration of the information processing apparatus illustrated in FIG. 1.

As illustrated in FIG. 2, the information processing apparatus 10 includes a communication unit (obtaining unit) 14 and a control unit 15. The information processing apparatus 10 also includes an input unit 16 and a storage unit 17.

The communication unit 14 may include at least one communication module connectable to the network 13. The communication module is, for example, a communication module that complies with a communication standard for a wired LAN (local area network), a wireless LAN, or Wi-Fi. The communication unit 14 may be connected to the network 13 over a wired LAN using the communication module.

The communication unit 14 may include a communication module communicable with various external devices over, for example, a communication link. The communication module is a communication module that complies with a standard for the communication link.

The communication link may be at least wired or wireless.

The communication unit 14 may be connected to an imaging unit, which will be described later, directly or indirectly over the network 13 or the communication link. When the communication unit 14 is connected indirectly to the imaging unit, for example, the communication unit 14 is, as described later, connected to the terminal apparatuses 12, each of which includes the imaging unit. The communication unit 14 obtains images generated by the imaging unit.

The communication unit 14 may be connected to an output device, which will be described later, directly or indirectly over the network 13 or the communication link.

The input unit 16 is capable of detecting operation inputs from a user. The input unit 16 includes at least one input interface capable of detecting inputs from the user. The input interface is, for example, physical keys, capacitive keys, a pointing device, a touch screen integrated with a display, a microphone, or the like.

The storage unit 17 includes a semiconductor memory, a magnetic memory, or an optical memory. The semiconductor memory is, for example, a RAM (random-access memory), a ROM (read-only memory), or the like. The RAM is, for example, an SRAM (static random-access memory), a DRAM (dynamic random-access memory), or the like. The ROM is, for example, an EEPROM (electrically erasable programmable read-only memory) or the like. The storage unit 17 may function as a main storage device, an auxiliary storage device, or a cache memory. The storage unit 17 stores data used to operate the information processing apparatus 10 and data obtained as a result of the operation of the information processing apparatus 10. For example, the storage unit 17 stores a system program, application programs, embedded software, and the like. For example, the storage unit 17 stores the first object recognizer as an object recognition model.

The control unit 15 includes at least one processor, at least one dedicated circuit, or a combination of these. The processor is a general-purpose processor or a dedicated processor specialized in a certain type of processing, such as a CPU (central processing unit) or a GPU (graphics processing unit). The dedicated circuit may be, for example, an FPGA (field-programmable gate array), an ASIC (application-specific integrated circuit), or the like. The control unit 15 performs processing relating to the operation of the information processing apparatus 10 while controlling the components of the information processing apparatus 10. The processing relating to the operation of the information processing apparatus 10 is, for example, retraining of the first object recognizer, which will be described later.

When the control unit 15 obtains information indicating results of object recognition from each terminal apparatus 12, the control unit 15 may read selling prices of estimated objects, which are the results of the object recognition, from the storage unit 17. The control unit 15 may calculate an amount demanded by adding up the selling prices of the estimated objects. The control unit 15 may transmit amount information corresponding to the amount demanded to the terminal apparatus 12 that has transmitted the information indicating the estimated objects.

Figure 3:
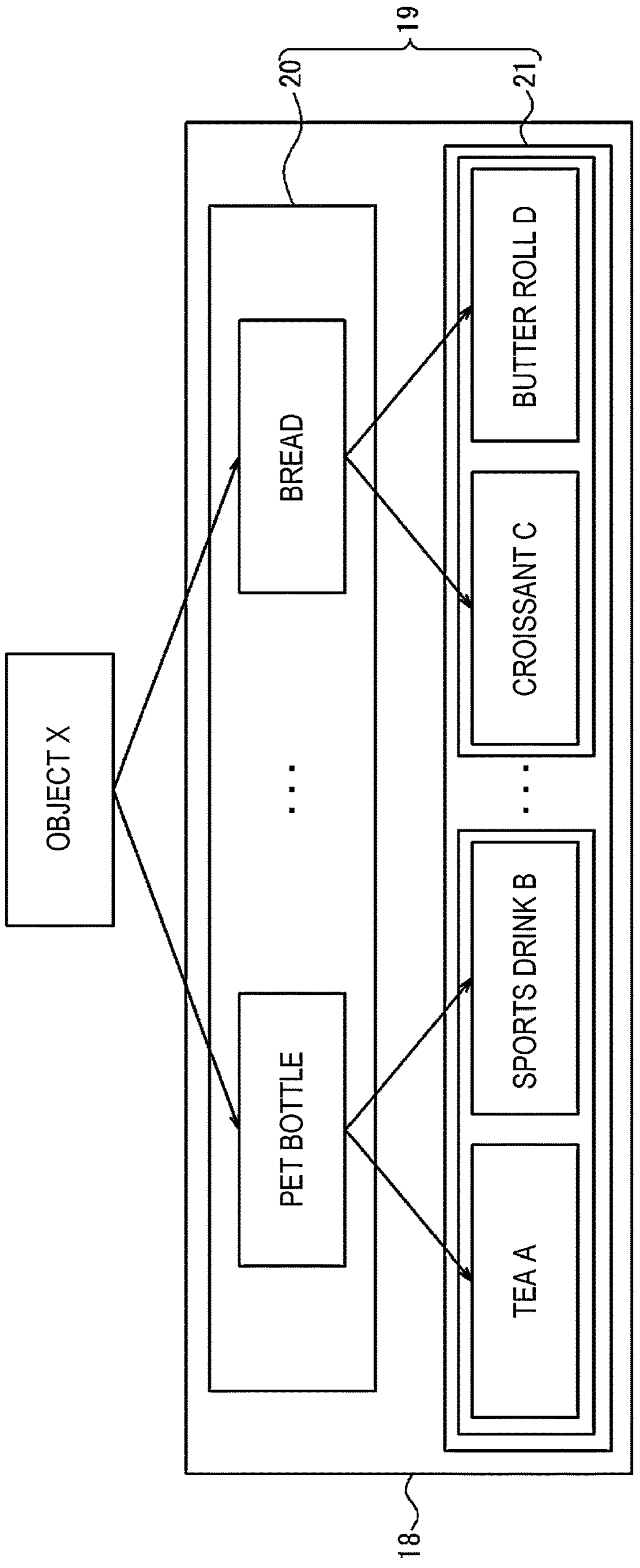
FIG. 3 is a diagram illustrating a schematic configuration of a first object recognizer used in the information processing system illustrated in FIG. 1.

The control unit 15 trains the first object recognizer with targets that have not been learned. As illustrated in FIG. 3, a first object recognizer 18 includes a plurality of stepwise determiners 19 in a multilayer structure. The stepwise determiners 19 include a top-layer determiner 20 and at least one lower-layer determiner 21. The top-layer determiner 20 classifies a target in a captured image into one of categories. The lower-layer determiner 21 classifies the target in a category determined by a stepwise determiner 19 in a higher layer into a lower category. The first object recognizer 18 recognizes a target in a captured image by classifying the target stepwise from a higher layer to a lower layer of the stepwise determiners 19 in the multilayer structure.

The top-layer determiner 20 may be a model trained in order to identify a category of a target in an image obtained by the first object recognizer 18. The lower-layer determiner 21 may be a model trained in order to identify a lower category of a category determined by a stepwise determiner 19 in a higher layer.

In the present embodiment, the stepwise determiners 19 include one lower-layer determiner 21. In other words, the first object recognizer 18 includes the top-layer determiner 20 in a first layer and the lower-layer determiner 21 in a second layer. In the following description, a category determined by the lower-layer determiner 21 in the second layer will also be referred to as a "class". When the first object recognizer 18 performs object recognition, the top-layer determiner 20 determines a category of a target and the lower-layer determiner 21 classifies the target in the category determined by the top-layer determiner 20 into a class to identify the target.

The first object recognizer 18 identifies, for example, an object X whose image has been captured by one of the terminal apparatuses 12, which will be described later, using the top-layer determiner 20 first. The top-layer determiner 20 determines a category, for example, by performing object recognition among categories in the top layer. When the information processing system 11 is used for sales management of a retail store, the categories in the top layer include, for example, types of product such as a PET bottle and a bread. The object recognition performed by the top-layer determiner 20 may be based on, for example, a DNN (deep neural network).

If the category of the object X in the top layer is determined as a PET bottle, the lower-layer determiner 21 then determines a class by performing object recognition among classes belonging to the category of a PET bottle. The classes belonging to the category of a PET bottle may include, for example, tea A and sports drink B. Classes belonging to the category of a bread may include, for example, croissant C and butter roll D. Classes determined by the lower-layer determiner 21 may be product names or IDs managed by a master computer in association with the product names. The object recognition performed by the lower-layer determiner 21 may be based on, for example, pattern matching.

Although an example where the categories in the top layer determined by the top-layer determiner 20 are types of product has been described, different categories may be used, instead. Depending on an object set as a target, three or more layers may be used for classification. For example, a target may be identified by classifying, using a lower-layer determiner 21 in a third layer, the target into one of subclasses belonging to a class determined by the lower-layer determiner 21 in the second layer. For example, subclasses of croissant C determined by the lower-layer determiner 21 in the second layer may include a brown sugar croissant and a butter croissant, and the lower-layer determiner 21 in the third layer may determine one of the subclasses. In other words, these steps of classification may be performed by determining whether types of captured images belong to the same category, whether the types of captured images belong to the same class, and whether the types of captured images belong to the same subclass.

In the training of the first object recognizer 18, first, the control unit 15 causes the stepwise determiners 19 to classify a target in an image obtained by the communication unit 14 from a higher layer to a lower layer. The control unit 15 identifies a lower-layer determiner 21 that cannot classify the target into an existing lower category in the stepwise classification. The control unit 15 adds a new lower category to a higher category corresponding to the lower-layer determiner 21 and trains the first object recognizer 18 by retraining the lower-layer determiner 21. A method for adding a new category to a higher category will be described hereinafter.

When the input unit 16 detects an operation input for specifying a new lower category, the control unit 15 may add the new lower category corresponding to the operation input to a higher category corresponding to a lower-layer determiner 21 that cannot classify a target into a lower category. The operation input may include determination of an existing higher category that is to include the new lower category. A case where a target that has not been learned by the first object recognizer 18 is "soda" will be described hereinafter as an example. The first object recognizer 18 classifies, using the top-layer determiner 20, soda, which is the target in an image obtained through the communication unit 14 into a PET bottle. Because the category of "PET bottle" does not include "soda", however, a lower-layer determiner 21 that classifies "PET bottle" into a lower category cannot perform the classification. If an operation input for inputting a product name of "soda" or the like to a new lower category is detected in this state, the control unit 15 adds "soda" to the category of "PET bottle". In other words, the control unit 15 adds a category of "soda" among categories for the lower-layer determiner 21 that classifies the target in the category of "PET bottle" into a lower category.

Alternatively, the control unit 15 may determine, on the basis of a result of recognition of a target performed by the first object recognizer 18, whether the target has been learned. More specifically, the control unit 15 may recognize the target using the first object recognizer 18 and determine whether a degree of reliability of classification of the target into a lower category performed by the lower-layer determiner 21 is lower than or equal to a threshold. The degree of reliability is an indicator indicating a probability of a result of classification of a target into a category. If the degree of reliability is lower than or equal to the threshold, the control unit 15 may add a new lower category to a higher category corresponding to the lower-layer determiner 21 that has classified the target into the lower category. If the target is "soda" that has not been learned by the first object recognizer 18, for example, the top-layer determiner 20 of the first object recognizer 18 is assumed to classify the target into "PET bottle". The lower-layer determiner 21 in the second layer corresponding to "PET bottle" classifies the target into a category other than "soda", which is not included as a category. The lower-layer determiner 21 calculates a relatively low degree of reliability when classifying the target into the category. If the calculated degree of reliability is lower than or equal to the threshold, the control unit 15 adds "soda" to the category of "PET bottle".

The control unit 15 may store parameters for constructing the first object recognizer 18 updated through the above-described training in the storage unit 17. The control unit 15 may transmit the parameters for constructing the updated first object recognizer 18 to the terminal apparatuses 12 over the communication unit 14.

The control unit 15 may determine whether a target in an image obtained by the communication unit 14 is similar to one of learned targets that can be recognized by the first object recognizer 18. The control unit 15 makes the similarity determination by, for example, comparing feature values such as averages of pixel values, histograms, or correlation coefficients. If the target in the image obtained by the communication unit 14 is similar to one of the learned targets, the control unit 15 may train the first object recognizer 18 as described above. If the target in the image obtained by the communication unit 14 is similar to none of the learned targets, the control unit 15 may construct a second object recognizer capable of recognizing the target in the image obtained by the communication unit 14 using the target without using the learned targets.

The control unit 15 may determine whether the top-layer determiner 20 of the first object recognizer 18 can classify a target in an image obtained by the communication unit 14 into one of categories. The determination may be made on the basis of whether a degree of reliability of a result of the classification performed by the top-layer determiner 20 is higher than or equal to a threshold. If the top-layer determiner 20 cannot classify the target, the control unit 15 may construct a second object recognizer capable of recognizing the target in an image obtained by the communication unit 14 using the target without using the learned targets that can be recognized by the first object recognizer 18.

The number of targets that can be recognized by the second object recognizer is not limited, and may be one or more. In other words, the control unit 15 may construct the second object recognizer by performing machine learning using one or more targets. If the first object recognizer cannot recognize a target during or after the construction of the second object recognizer, the control unit 15 may use the target to train the second object recognizer. Alternatively, if the first object recognizer cannot recognize a target during or after the construction of the second object recognizer, the control unit 15 may construct another second object recognizer capable of recognizing the target separately from the foregoing second object recognizer. In other words, the control unit 15 may construct a plurality of second object recognizers.

The control unit 15 may store parameters for constructing a new second object recognizer in the storage unit 17. The control unit 15 may transmit the parameters for constructing the second object recognizer to the terminal apparatuses 12 through the communication unit 14.

After transmitting the parameters for constructing the second object recognizer, the control unit 15 may retrain the first object recognizer 18 using a target that can be recognized by the second object recognizer and the learned targets that can be recognized by the first object recognizer 18. When retraining the first object recognizer 18, the control unit 15 may associate a flag indicating the retraining with the parameters for constructing the second object recognizer and transmit the parameters to the terminal apparatuses 14. The control unit 15 may update the first object recognizer 18 by retraining the first object recognizer 18. The control unit 15 may store parameters for constructing the updated first object recognizer 18 in the storage unit 17. The control unit 15 may transmit the parameters for constructing the updated first object recognizer 18 to the terminal apparatuses 12 through the communication unit 14. The control unit 15 may associate an instruction to remove the flag associated with the parameters for constructing the second object recognizer with the parameters for constructing the updated first object recognizer 18 and transmit the parameters to the terminal apparatuses 12.

Figure 4:
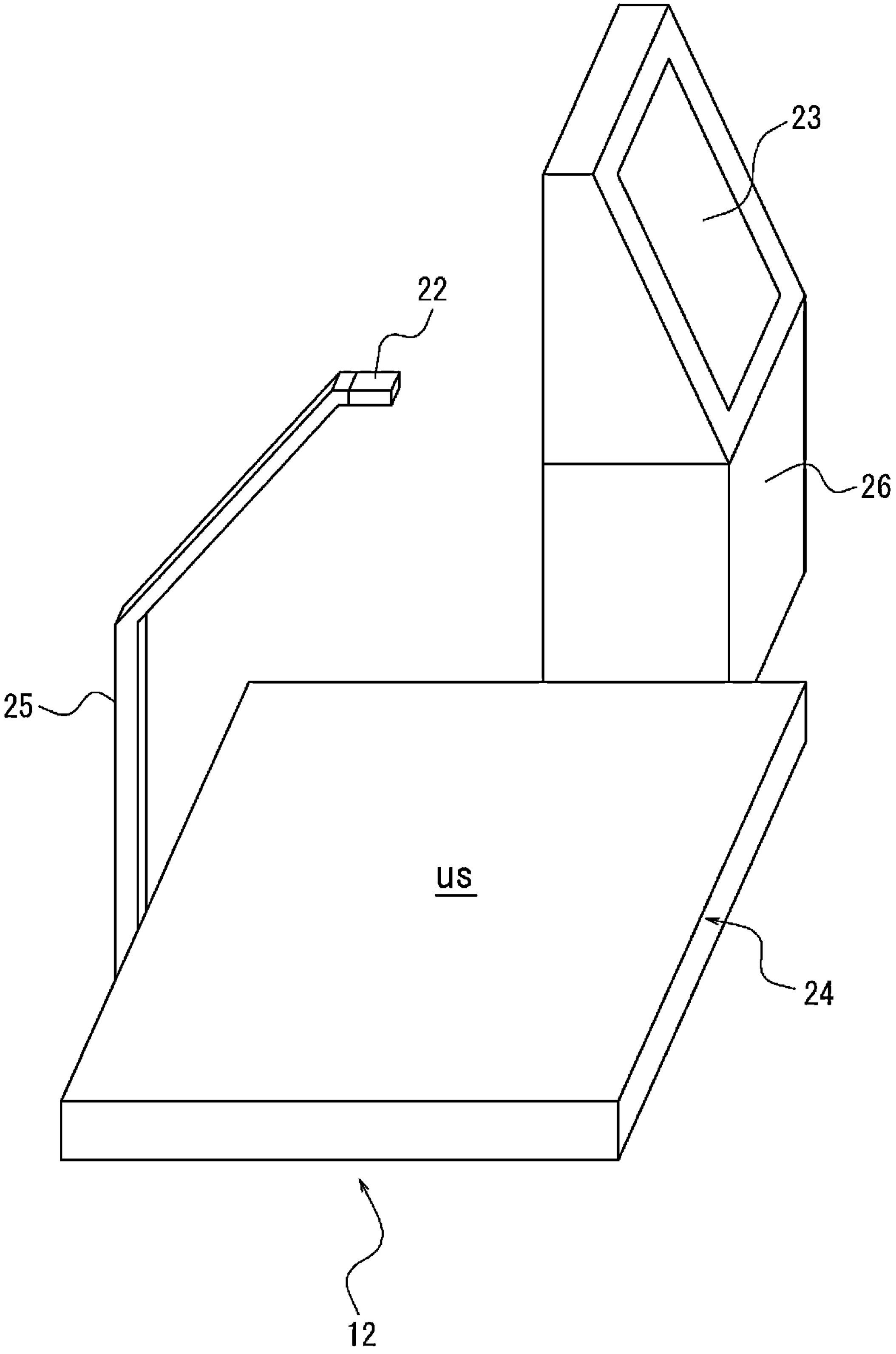
FIG. 4 is a perspective view illustrating an appearance of a terminal apparatus illustrated in FIG. 1.

As illustrated in FIG. 4, each terminal apparatus 12 includes an imaging unit 22, an output device 23, a platform 24, a support pillar 25, and a recognition device 26.

The imaging unit 22 is fixed, for example, in such a way as to be able to capture an image of the entirety of the platform 24. The imaging unit 22 is fixed, for example, on the support pillar 25 extending from a side surface of the platform 24. The imaging unit 22 is fixed, for example, in such a way as to be able to capture an image of the entirety of an upper surface us of the platform 24 with an optical axis thereof being perpendicular to the upper surface us.

The imaging unit 22 may include a visible light camera or an infrared light camera. The camera includes an imaging optical system and an imaging device. The imaging optical system includes, for example, optical members such as one or more lenses and a diaphragm. The lens may have any focal length and may be, for example, a general lens, a wide-angle lens including a fisheye lens, or a zoom lens with variable focal length. The imaging optical system forms an image of a subject onto a light receiving surface of the imaging device. The imaging device is, for example, a CCD (charge-coupled device) image sensor, a CMOS (complementary metal-oxide-semiconductor) image sensor, an FIR (far-infrared rays) camera, or the like. The imaging device generates a captured image by capturing the image of the subject formed onto the light receiving surface.

The output device 23 may be any known display that displays images. As described later, the display may function as a touch screen. The output device 23 may be a speaker that notifies of information. The output device 23 may display, for example, a result of object recognition performed by the recognition device 26. The output device 23 may perform various types of notification if, for example, a failure of the information processing system 11 or the like occurs. The output device 23 may leave, as a sound or the like, a result of a determination made by the recognition device 26 and whether to retrain of the first object recognizer 18.

Figure 5:
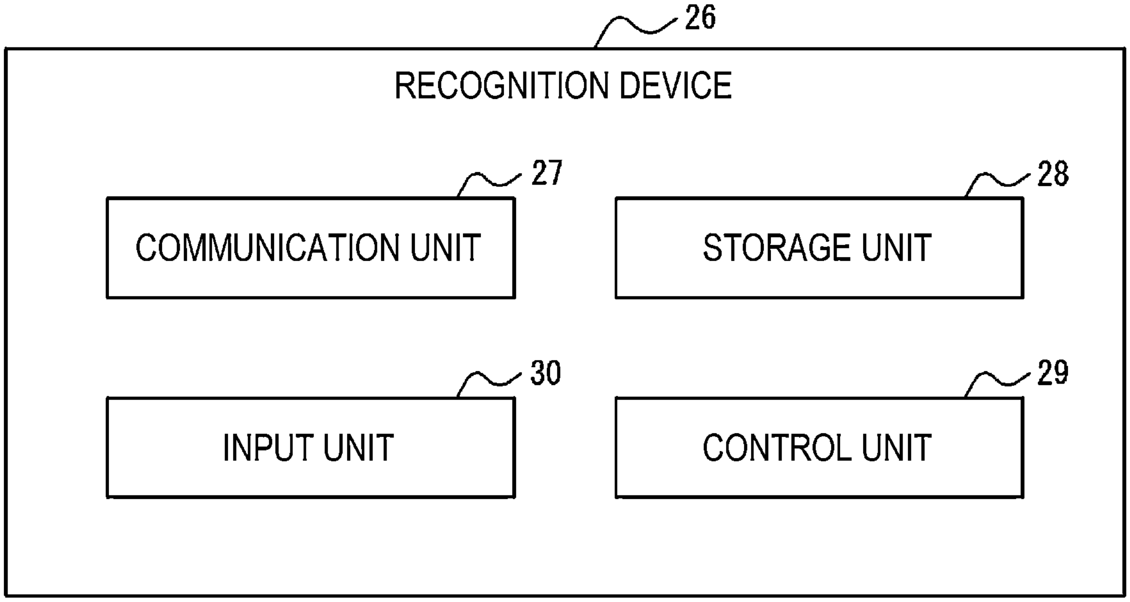
FIG. 5 is a block diagram illustrating a schematic configuration of a recognition device illustrated in FIG. 4.

As illustrated in FIG. 5, the recognition device 26 includes a communication unit 27 (obtaining unit), a storage unit 28, and a control unit 29. The recognition device 26 may further include an input unit 30. Although the recognition device 26 is a device separate from the imaging unit 22 and the output device 23 in the first embodiment, the recognition device 26 may be integrated with at least the imaging unit 22, the platform 24, the support pillar 25, or the output device 23, instead.

The communication unit 27 includes, for example, a communication module that communicates with the imaging unit 22 through a wired or wireless communication link. The communication unit 27 receives, that is, obtains, an image from the imaging unit 22 as a signal. The communication unit 27 may include a communication module that communicates with the output device 23 through the communication link. The communication unit 27 may transmit an image to be displayed to the output device 23 as an image signal. The communication unit 27 may receive, from the output device 23 that is the display, a position signal corresponding to a position on a display surface at which a contact has been detected. The communication unit 27 includes a communication module that communicates with the information processing apparatus 10 over the network 13. The communication unit 27 receives parameters for constructing the first object recognizer 18 from the information processing apparatus 10. The communication unit 27 may transmit result information corresponding to a confirmed result of recognition, which will be described later, to the information processing apparatus 10. The communication unit 27 may receive, from the information processing apparatus 10, amount information corresponding to an amount demanded.

The input unit 30 is capable of detecting operation inputs from the user. The input unit 30 includes at least one input interface capable of detecting inputs from the user. The input interface is, for example, physical keys, capacitive keys, a pointing device, a touch screen integrated with a display, a microphone, or the like. In the present embodiment, an input/output interface is a touch screen employing the output device 23.

The storage unit 28 includes a semiconductor memory, a magnetic memory, or an optical memory. The semiconductor memory is, for example, a RAM, a ROM, or the like. The RAM is, for example, an SRAM, a DRAM, or the like. The ROM is, for example, an EEPROM or the like. The storage unit 28 may function as a main storage device, an auxiliary storage device, or a cache memory. The storage unit 28 stores data used to operate the recognition device 26 and data obtained as a result of the operation of the recognition device 26. For example, the storage unit 28 stores a system program, application programs, embedded software, and the like. For example, the storage unit 28 stores parameters for constructing the first object recognizer 18 and the second object recognizer obtained from the information processing apparatus 10.

The control unit 29 includes at least one processor, at least one dedicated circuit, or a combination of these. The processor is a general purpose processor or a dedicated processor specialized in a certain type of processing, such as a CPU or a GPU. The dedicated circuit may be, for example, an FPGA, an ASIC, or the like. The control unit 29 performs processing relating to the operation of the recognition device 26 while controlling the components of the recognition device 26. The processing relating to the operation of the recognition device 26 is, for example, object recognition.

The control unit 29 performs object recognition on a target included in an image obtained by the communication unit 27 using the first object recognizer 18 first. If the first object recognizer 18 cannot recognize the target, the control unit 29 performs object recognition using the second object recognizer. When a plurality of second object recognizers is constructed as described above, the control unit 29 may perform object recognition using one of the second object recognizers.

Alternatively, the control unit 29 performs object recognition on a target included in an image obtained by the communication unit 27 using both the first object recognizer 18 and the second object recognizer. In the object recognition where both the first object recognizer 18 and the second object recognizer are used, the control unit 29 calculates degrees of reliability. The control unit 29 employs a result of the object recognition performed by the first object recognizer 18 or the second object recognizer on the basis of the degrees of reliability of the object recognition performed by the first object recognizer 18 and the second object recognizer. The control unit 29 employs, for example, a result of the object recognition with a higher degree of reliability.

After obtaining the parameters for constructing the second object recognizer from the information processing apparatus 10, the control unit 29 performs object recognition on a target included in an image obtained by the communication unit 27 using the first object recognizer 18 before update and the second object recognizer as described above until the retrained first object recognizer 18 is provided. After obtaining the parameters for constructing the updated first object recognizer 18, which has been obtained by retraining the first object recognizer 18 with the target that can be recognized by the second object recognizer, the control unit 29 performs object recognition using only the updated first object recognizer 18 without using the second object recognizer.

The control unit 29 may cause the output device 23 to output a result of object recognition. The control unit 29 may transmit the result of object recognition to the information processing apparatus 10.

Figure 6:
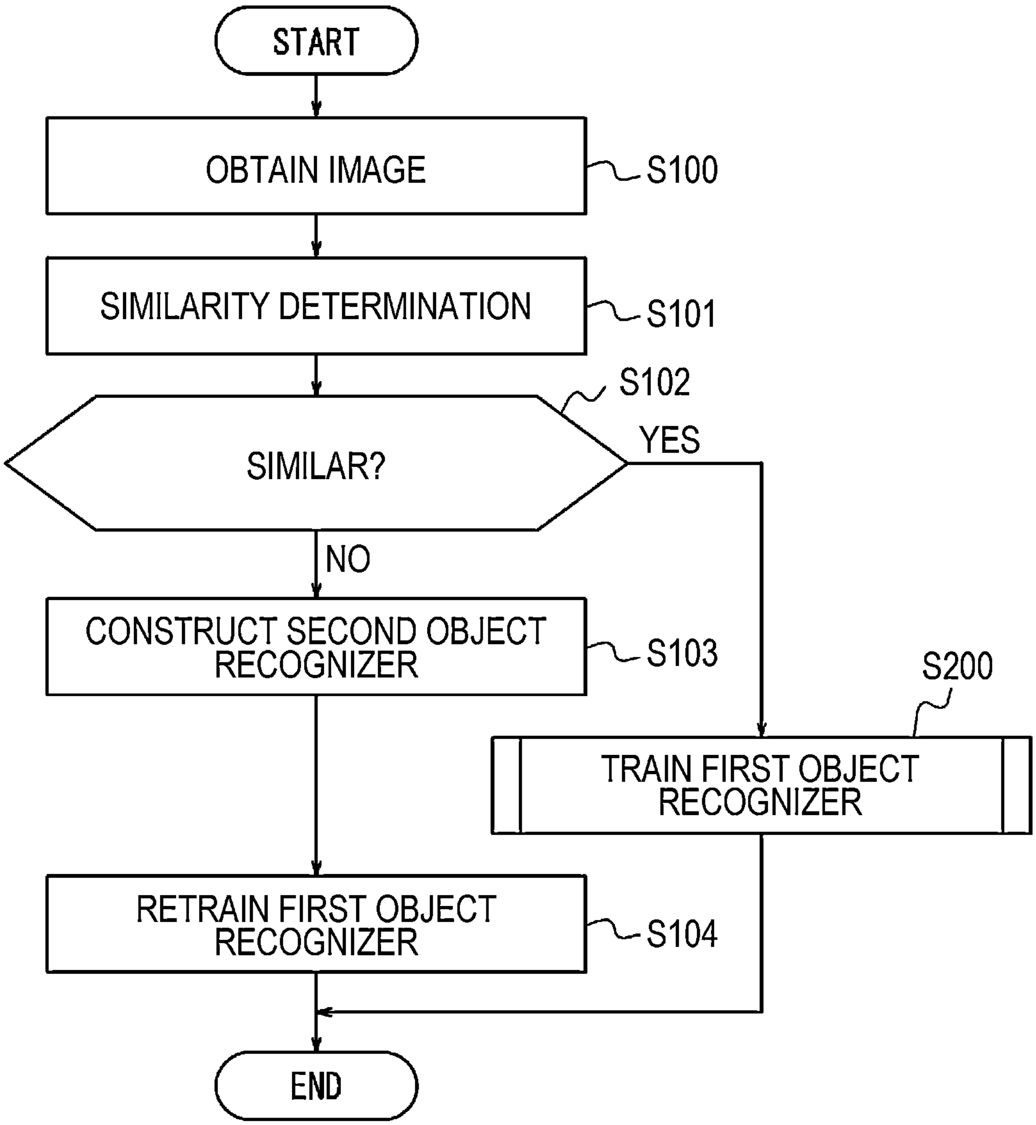
FIG. 6 is a flowchart illustrating a first retraining process performed by a control unit illustrated in FIG. 2.

A first retraining process performed by the control unit 15 of the information processing apparatus 10 according to the first embodiment will be described with reference to a flowchart of FIG. 6. The first retraining process starts when the input unit 16 of the information processing apparatus 10 or the input unit 30 of the recognition device 26 detects an operation input for requesting first retraining.

In step S100, the control unit 15 obtains an image from the imaging unit 22 or an imaging unit directly connected to the information processing apparatus 10. The control unit 15 may cause, as necessary, the output device 23 or an output device directly connected to the information processing apparatus 10 to output a request to capture an image of a target likely to need to be learned and obtain the image captured thereafter. After the image is obtained, the process proceeds to step S101.

In step S101, the control unit 15 determines similarity between a target included in the image obtained in step S100 and targets already learned by the first object recognizer 18. After the similarity determination, the process proceeds to step S102.

In step S102, the control unit 15 determines whether the target included in the image obtained in step S100 is similar to at least one of the learned targets. If so, the process proceeds to step S200. If the image is not similar to none of the learned targets, the process proceeds to step S103.

In step S200, the control unit 15 performs a subroutine for training the first object recognizer as described later. After the subroutine is performed, the first retraining process ends.

In step S103, the control unit 15 constructs a second object recognizer with only the target included in the image obtained in step S100 without using the targets already learned by the first object recognizer 18. The control unit 15 stores parameters for constructing the second object recognizer in the storage unit 17. The control unit 15 transmits the parameters for constructing the second object recognizer to the terminal apparatuses 12. After the transmission, the process proceeds to step S104.

In step S104, the control unit 15 retrains the first object recognizer 18 using the target that can be recognized by the second object recognizer constructed in step S103 and the targets already learned by the first object recognizer 18. The control unit 15 stores, in the storage unit 17, parameters for constructing the first object recognizer 18 updated through the retraining. The control unit 15 also transmits the parameters for constructing the first object recognizer to the terminal apparatuses 12. After the transmission, the first retraining process ends.

Figure 7:
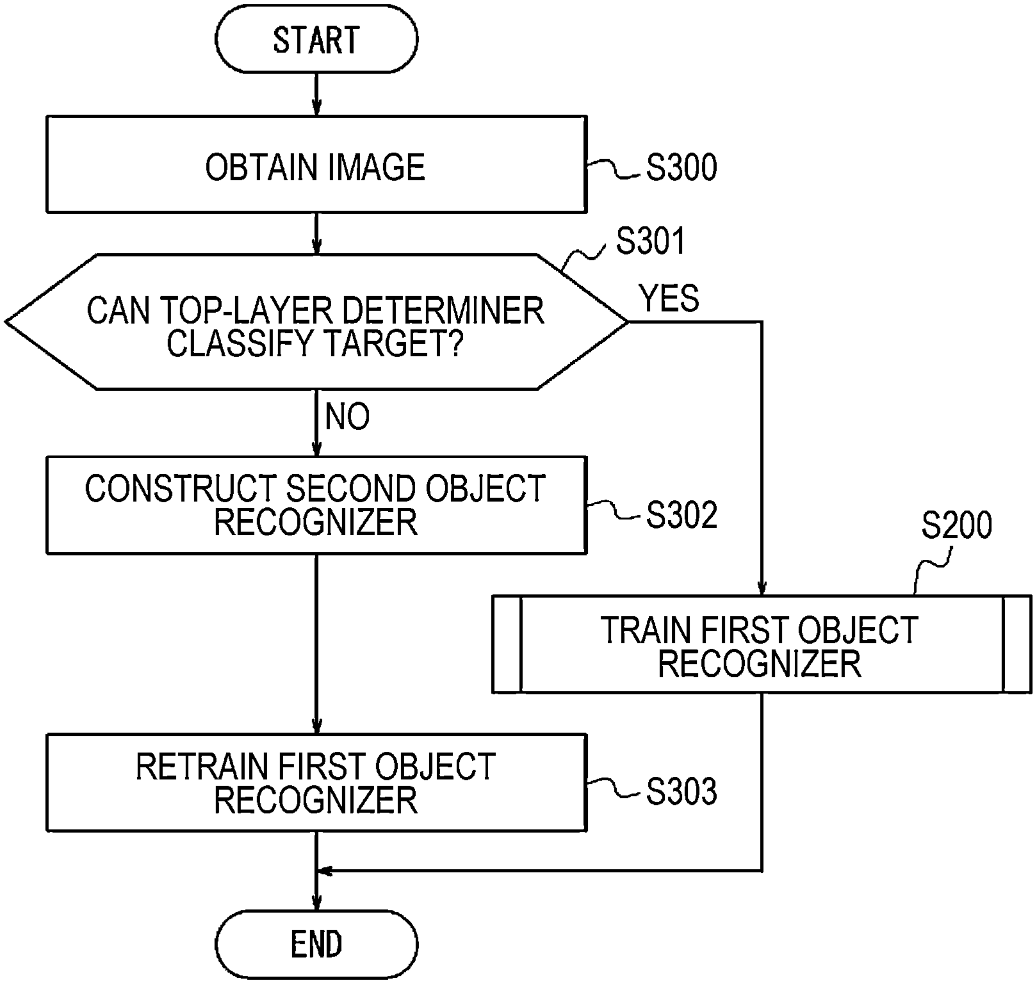
FIG. 7 is a flowchart illustrating a second retraining process performed by the control unit illustrated in FIG. 2.

A second retraining process performed by the control unit 15 of the information processing apparatus 10 instead of the first retraining process in the first embodiment will be described with reference to FIG. 7. The first retraining process starts when the input unit 16 of the information processing apparatus 10 or the input unit 30 of the recognition device 26 detects an operation input for requesting the first retraining.

In step S300, the control unit 15 performs the same processing as in step S100 of the first retraining process. After an image is obtained, the process proceeds to step S301.

In step S301, the control unit 15 determines whether the top-layer determiner 20 can classify a target included in the image obtained in step S300. If so, the process proceeds to step S200. If not, the process proceeds to step S302.

In step S200, the control unit 15 performs the subroutine for training the first object recognizer as described later. After the subroutine is performed, the second retraining process ends.

In steps S302 and S303, the control unit 15 performs the same processing as in steps S103 and S104, respectively, of the first retraining process. After parameters are transmitted, the second retraining process ends.

Figure 8:
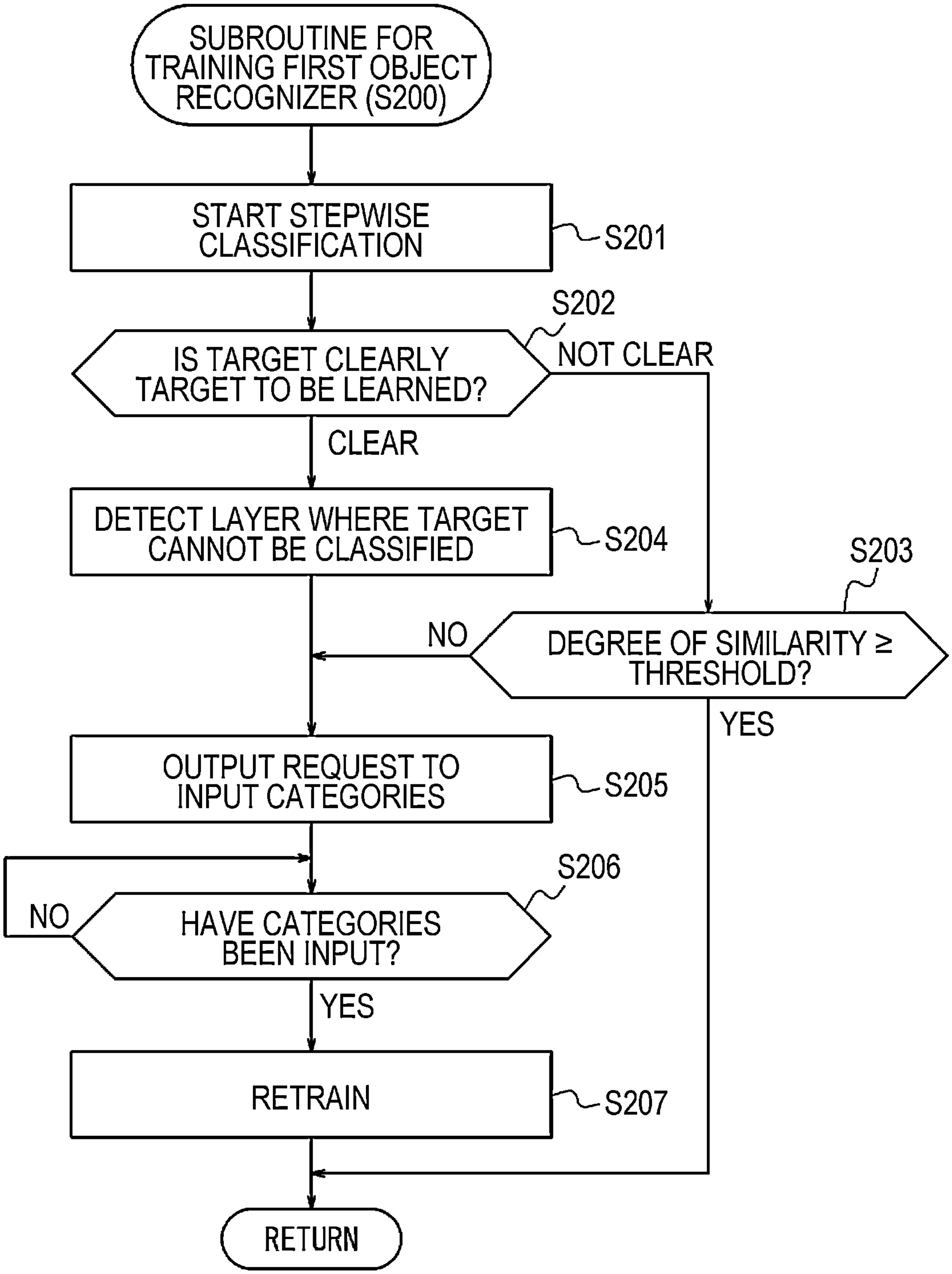
FIG. 8 is a flowchart illustrating a subroutine for training the first object recognizer performed by the control unit illustrated in FIG. 2.

The subroutine for training the first object recognizer performed by the control unit 15 of the information processing apparatus 10 in the first embodiment will be described with reference to a flowchart of FIG. 8.

In step S201, the control unit 15 causes the first object recognizer 18 to start stepwise classification from a highest layer to a lowest layer. After the start of the classification, the process proceeds to step S202.

In step S202, the control unit 15 determines whether a target included in an image is clearly a target to be learned. The determination is made on the basis of presence or absence of an operation input indicating that the target is clearly a target to be learned to the input unit 16 of the information processing apparatus 10 or the input unit 30 of the recognition device 26. If whether the target is a target to be learned is not clear, the process proceeds to step S203. If the target is clearly a target to be learned, the process proceeds to step S204.

In step S203, the control unit 15 determines whether degrees of reliability of object recognition performed by the stepwise determiners 19 on the target are higher than or equal to a threshold. If the degrees of reliability of the object recognition performed by the stepwise determiners 19 in all the layers are higher than or equal to the threshold, the subroutine S200 for training the first object recognizer ends. If the degree of reliability of the object recognition performed by any of the stepwise determiners 19 is not higher than or equal to the threshold, the process proceeds to step S205.

In step S204, the control unit 15 detects a layer of a stepwise determiner 19 that cannot classify the target included in the image obtained in step S100 of the first retraining process or step S300 of the second retraining process. After the detection of the layer, the process proceeds to step S205.

In step S205, the control unit 15 causes the output device 23 or the output device directly connected to the information processing apparatus 10 to output a request for operation inputs indicating categories to which the target belongs in layers lower than that where the degree of reliability has been lower than or equal to the threshold in step S203 or categories to which the target belongs in layers lower than that detected in step S204. After the output, the process proceeds to step S206.

In step S206, the control unit 15 determines whether all categories with respect to which operation inputs have been requested for in step S205 have been input. If not, the process returns to step S206. If so, the process proceeds to step S207.

In step S207, the control unit 15 adds the categories that have been confirmed in step S206 to have been input and retrains the stepwise determiners 19 in the layers lower than that where the degree of reliability has been lower than the threshold in step S203 or that detected in step S204. The control unit 15 stores parameters for constructing the trained first object recognizer in the storage unit 17. The control unit 15 transmits the parameters for constructing the trained first object recognizer to the terminal apparatuses 12. After the transmission, the subroutine for training the first object recognizer ends.

Figure 9:
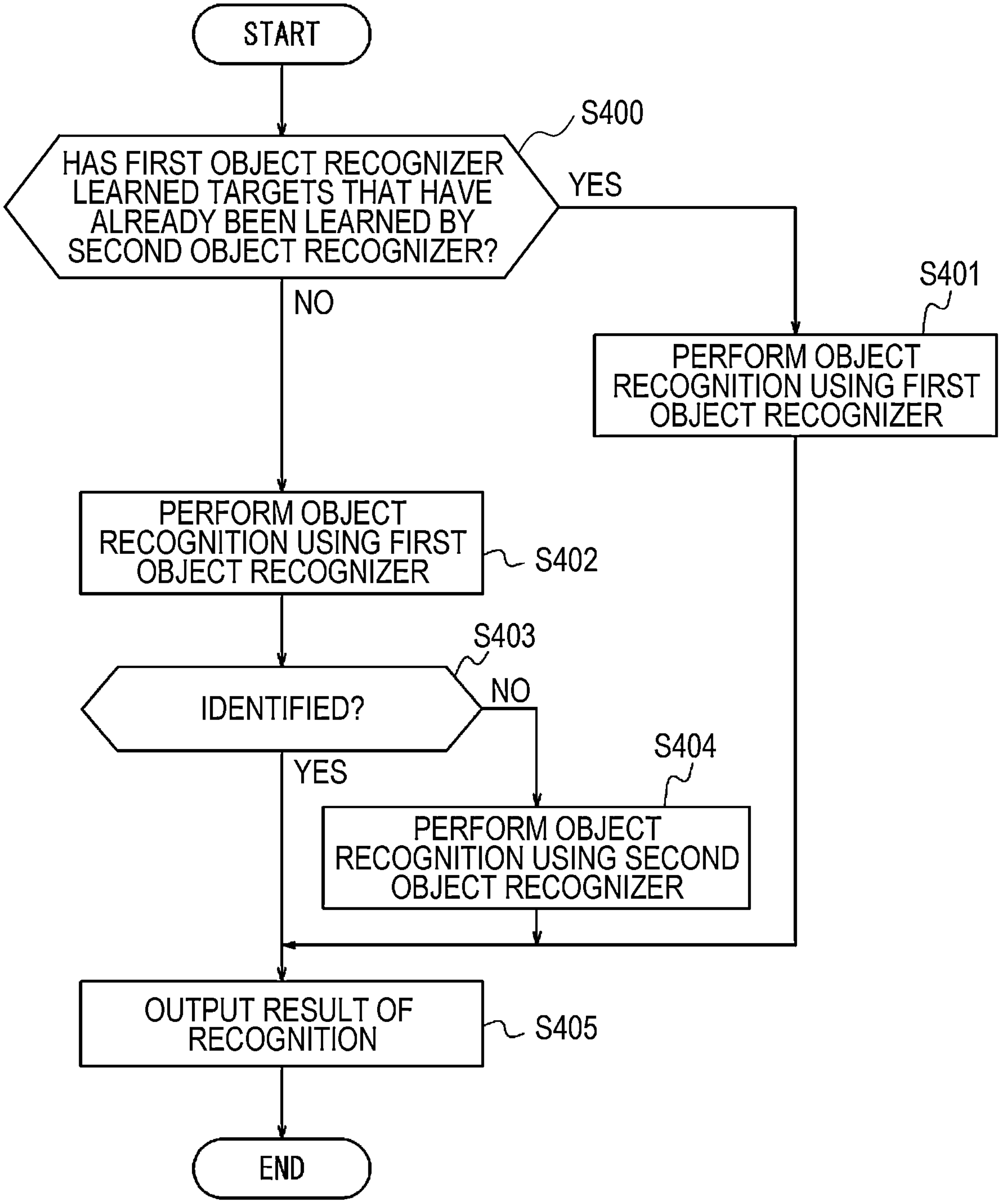
FIG. 9 is a flowchart illustrating a first recognition process performed by a control unit illustrated in FIG. 5.

A first recognition process performed by the control unit 29 of the recognition device 26 in the first embodiment will be described with reference to a flowchart of FIG. 9. The first recognition process starts each time an image is obtained from the imaging unit 22.

In step S400, the control unit 29 determines whether the first object recognizer 18 has learned a target already learned by the second object recognizer. If so, the process proceeds to step S401. If not, the process proceeds to step S402.

In step S401, the control unit 29 performs object recognition on a target included in the obtained image using the first object recognizer 18 that has learned the target already learned by the second object recognizer. After the object recognition, the process proceeds to step S405.

In step S402, the control unit 29 performs object recognition using the first object recognizer 18 that has not learned the target already learned by the second object recognizer.

After the object recognition, the process proceeds to step S403.

In step S403, the control unit 29 determines whether the target has been identified as a result of the object recognition in step S402. If not, the process proceeds to step S4040. If so, the process proceeds to step S405.

In step S404, the control unit 29 performs object recognition using the second object recognizer. After the object recognition, the process proceeds to step S405.

In step S405, the control unit 29 outputs a result of the object recognition performed in step S401, S402, or S404 to the output device 23. After the output, the first recognition process ends.

Figure 10:
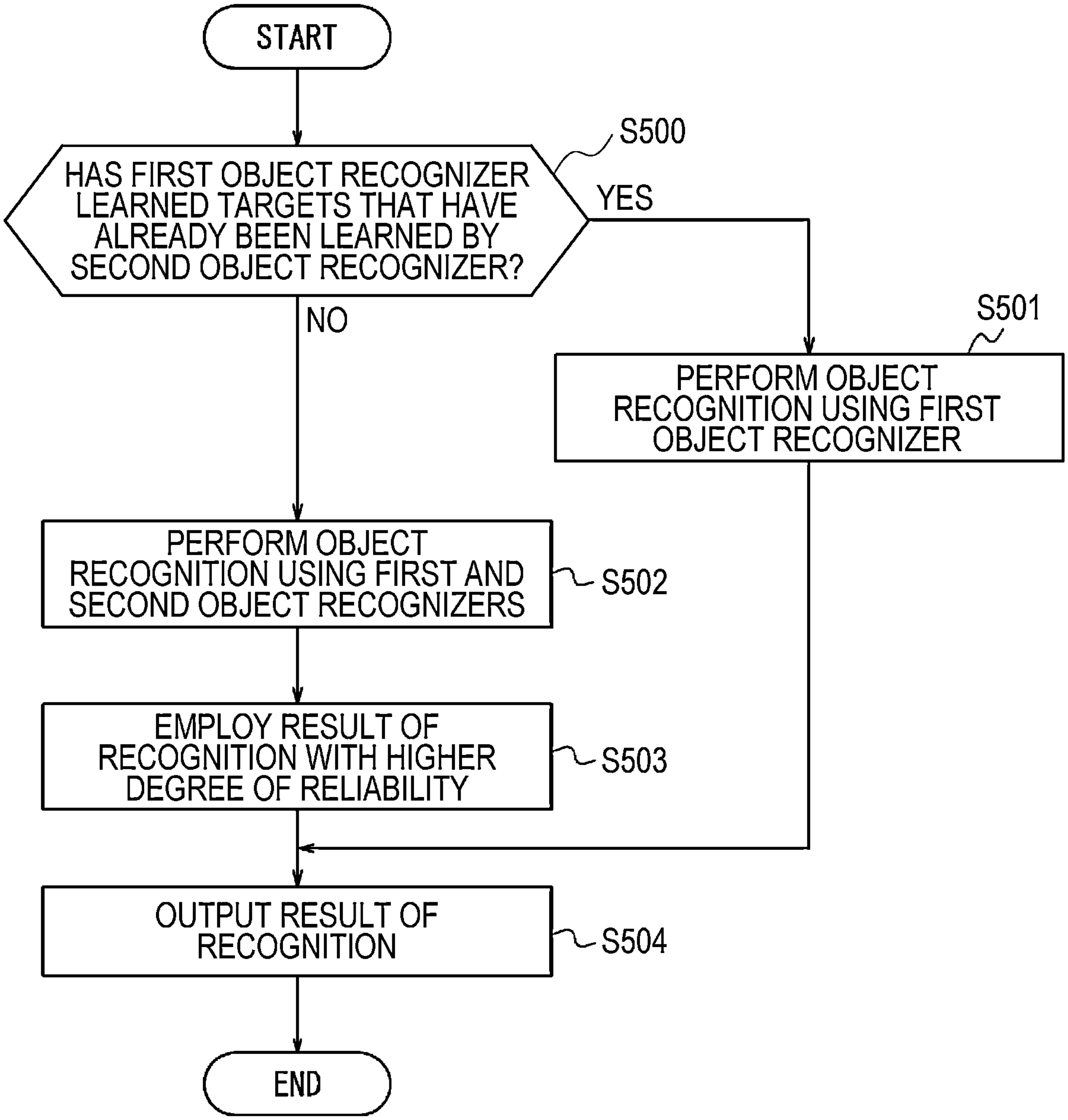
FIG. 10 is a flowchart illustrating a second recognition process performed by the control unit illustrated in FIG. 5.

A second recognition process performed by the control unit 29 of the recognition device 26 in the first embodiment instead of the first recognition process will be described with reference to a flowchart of FIG. 10. The second recognition process starts each time an image is obtained from the imaging unit 22.

In steps S500 and S501, the control unit 29 performs the same processing in steps S401 and S402, respectively, of the first recognition process. After the object recognition in step S501, the process proceeds to step S504.

In step S502, the control unit 29 performs object recognition using both the first object recognizer 18 and the second object recognizer. After the object recognition, the process proceeds to step S505.

In step S503, the control unit 29 employs a result of the recognition performed in step S502 by the first object recognizer 18 or the second object recognizer with a higher degree of reliability, as an official result of the recognition. After the employment, the process proceeds to step S504.

In step S504, the control unit 29 outputs a result of the object recognition performed in step S501 or the result of the recognition employed in step S503 to the output device 23. After the output, the second recognition process ends.

In the first embodiment, the information processing apparatus 10 having the above-described configuration trains the first object recognizer 18 by causing the stepwise determiners 19 to classify a target in an image obtained by the communication unit 14 from a higher layer to a lower layer and adding new lower categories to a higher category corresponding to a lower-layer determiner 21 that cannot classify the target into an existing lower category. With this configuration, since the information processing apparatus 10 trains a subset of the stepwise recognizers 18 in a multilayer structure, training time can be reduced compared to when an object recognition model that does not have a multilayer structure is trained. The information processing apparatus 10, therefore, can facilitate use of an object recognition model.

In the first embodiment, the information processing apparatus 10 adds new lower categories corresponding to operation inputs detected by the input unit 16. With this configuration, the information processing apparatus 10 can train the first object recognizer 18 by adding categories of a target determined by the user to have not been learned to the first object recognizer 18.

In the first embodiment, the information processing apparatus 10 recognizes a target using the first object recognizer 18 and, if a degree of reliability of classification into a lower category is lower than or equal to a threshold, adds new lower categories to a higher category corresponding to a lower-layer determiner 21 that has classified the target into the lower category. With this configuration, the information processing apparatus 10 can determine whether a target has been learned even if whether the first object recognizer 18 has learned the target is not clear. The information processing apparatus 10, therefore, can automatically determine whether the first object recognizer 18 has learned a target and train the first object recognizer 18 without the user determining whether the first object recognizer 18 has learned the target.

In the first embodiment, the information processing apparatus 10 trains the first object recognizer 18 if a target is similar to one of learned targets that can be recognized by the first object recognizer 18 or, if a target is not similar to any of the learned objects, constructs a second object recognizer capable of recognizing the target included in an image newly obtained by the communication unit 14 using only the target without using the learned targets. In order to train the first object recognizer 18 using a target that cannot be classified by the top-layer determiner 20, the entirety of the first object recognizer 18 needs to be trained, and training time might become long. The information processing apparatus 10 having the above-described configuration for such an event can determine whether the top-layer determiner 20 of the first object recognizer 18 can classify a target and, if the top-layer determiner 20 cannot classify the target, construct a new second object recognizer. Since the information processing apparatus 10 can construct a second object recognizer in shorter training time than for the entirety of the first object recognizer 18, therefore, training time for an object recognizer capable of identifying a target that has not been learned can be reduced.

In the first embodiment, if the top-layer determiner 20 cannot classify a target, the information processing apparatus 10 constructs a second object recognizer capable of recognizing the target included in an image newly obtained by the communication unit 14 using the target without using learned targets that can be recognized by the first object recognizer 18. Since the information processing apparatus 10 can construct a second object recognizer in shorter training time than for the entirety of the first object recognizer 18, therefore, training time for an object recognizer capable of identifying a target that has not been learned can be reduced.

In the first embodiment, the information processing apparatus 10 updates the first object recognizer 18 by retraining the first object recognizer 18 using a target that can be recognized by the second object recognizer and learned targets. With this configuration, the information processing apparatus 10 can prevent unlimited construction of a plurality of second object recognizers for targets that have not been learned and provide a condition where the second object recognizer is also used until the training of the first object recognizer 18 ends.

In the first embodiment, the recognition device 26 recognizes a target included in an image using the first object recognizer 18 and, if the first object recognizer 18 cannot recognize the target, recognizes the target using the second object recognizer. With this configuration, since the recognition device 26 can recognize a target using the first object recognizer 18 or the second object recognizer that can be trained relatively fast, therefore, a period of time for which a new target cannot recognized can be reduced.

In the first embodiment, the recognition device 26 recognizes a target included in an image using both the first object recognizer 18 and the second object recognizer and employs a result of the recognition performed by the first object recognizer 18 or the second object recognizer on the basis of degrees of reliability calculated for the recognition. With this configuration, too, the recognition device 26 can recognize a target using the first object recognizer 18 or the second object recognizer that can be trained relatively fast, and a period of time for which a new target cannot be recognized can be reduced.

In the first embodiment, the recognition device 26 recognizes a target included in an image using the first object recognizer 18 before update and the second object recognizer and, after the updated first object recognizer 18 is obtained, recognizes a target using only the first object recognizer. With this configuration, the recognition device 26 can prevent construction of a plurality of second object recognizers for different targets that have not been learned and provide a condition where the second object recognizer is also used until the training of the first object recognizer 18 ends.

An information processing apparatus according to a second embodiment of the present disclosure will be described. In the second embodiment, structure of a first object recognition model is different from that in the first embodiment. The second embodiment will be described hereinafter while focusing on differences from the first embodiment. Parts having the same configuration as in the first embodiment will be given the same reference numerals.

An information processing system 11 including an information processing apparatus 10 that functions as a recognizer training apparatus according to the second embodiment includes, as in the first embodiment, at least one terminal apparatus 12, a network 13, and the information processing apparatus 10.

In the second embodiment, the information processing apparatus 10 may include, as in the first embodiment, a communication unit (obtaining unit) 14 and a control unit 15 and further include an input unit 16 and a storage unit 17. In the second embodiment, configuration of the communication unit 14, the control unit 15, the input unit 16, and the storage unit 17 is the same as in the first embodiment. In the second embodiment, functions of the communication unit 14, the input unit 16, and the storage unit 17 are the same as those in the first embodiment.

In the second embodiment, when the control unit 15 obtains information indicating results of object recognition from one of the terminal apparatuses 12, the control unit 15 may read, as in the first embodiment, selling prices of estimated objects, which are the results of object recognition, from the storage unit 17. The control unit 15 may calculate an amount demanded by adding up the selling prices of the estimated objects. The control unit 15 may transmit amount information corresponding to the amount demanded to the terminal apparatus 12 that has transmitted the information indicating the estimated objects.

In the second embodiment, if a first object recognizer capable of recognizing learned targets cannot recognize a target included in an image obtained by the communication unit 14, the control unit 15 constructs a second object recognizer unlike in the first embodiment. The first object recognizer may be any recognition model constructed through machine learning and different from the first object recognizer 18 in the first embodiment. In other words, the first object recognizer in the second embodiment is not limited to a configuration including a plurality of stepwise determiners in a multilayer structure. The control unit 15 constructs the second object recognizer capable of recognizing a target included in an image obtained by the communication unit 14 using the target without using the targets already learned by the first object recognizer.

In the second embodiment, when the input unit 16 detects an operation input for starting the construction of a second object recognizer, the control unit 15 may determine that the first object recognition model cannot recognize a target included in an image obtained by the communication unit 14, and newly construct a second object recognizer.

In the second embodiment, the control unit 15 may cause the first object recognition model to perform object recognition on a target included in an image obtained by the communication unit 14 and calculate a degree of reliability of the object recognition. If the calculated degree of reliability is lower than or equal to a threshold, the control unit 15 may determine that the first object recognition model cannot recognize the target, and newly construct a second object recognizer.

In the second embodiment, as in the first embodiment, the control unit 15 may store parameters for constructing a new second object recognizer in the storage unit 17. The control unit 15 may transmit the parameters for constructing the second object recognizer to the terminal apparatuses 12 through the communication unit 14.

In the second embodiment, after transmitting the parameters for constructing the second object recognizer, the control unit 15 may, as in the first embodiment, retrain the first object recognizer using a target that can be recognized by the second object recognizer and the learned targets that can be recognized by the first object recognizer. The control unit 15 may update the first object recognizer through retraining of the first object recognizer. The control unit 15 may store parameters for constructing the updated first object recognizer in the storage unit. The control unit 15 may transmit the parameters for constructing the updated first object recognizer to the terminal apparatuses 12 through the communication unit 14.

In the second embodiment, as in the first embodiment, each terminal apparatus 12 includes an imaging unit 22, an output device 23, a platform 24, a support pillar 25, and a recognition device 26. In the second embodiment, configuration of the imaging unit 22, the output device 23, the platform 24, the support pillar 25, and the recognition device 26 is the same as that in the first embodiment. In the second embodiment, functions of the imaging unit 22, the output device 23, the platform 24, the support pillar 25, and the recognition device 26 are the same as those in the first embodiment.

Figure 11:
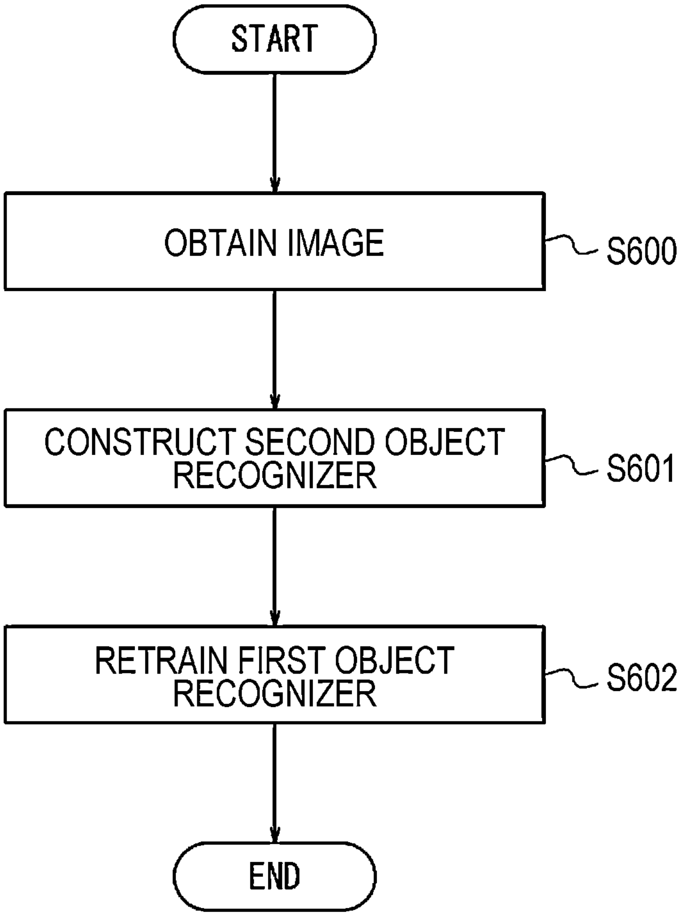
FIG. 11 is a flowchart illustrating a first retraining process performed by the control unit illustrated in FIG. 2 according to a second embodiment.

A first retraining process performed by the control unit 15 of the information processing apparatus 10 in the second embodiment will be described with reference to a flowchart of FIG. 11. The first retraining process starts when the input unit 16 of the information processing apparatus 10 or the input unit 30 of the recognition device 26 detects an operation input for requesting first retraining.

In step S600, the control unit 15 performs the same processing as in step S100 of the first retraining process according to the first embodiment. After an image is obtained, the process proceeds to step S601.

In steps S601 and S602, the control unit 15 performs the same processing as in steps S103 and S104, respectively, of the first retraining process according to the first embodiment. In step S602, after parameters for constructing the first object recognizer are transmitted to the terminal apparatuses 12, the first retraining process ends.

Figure 12:
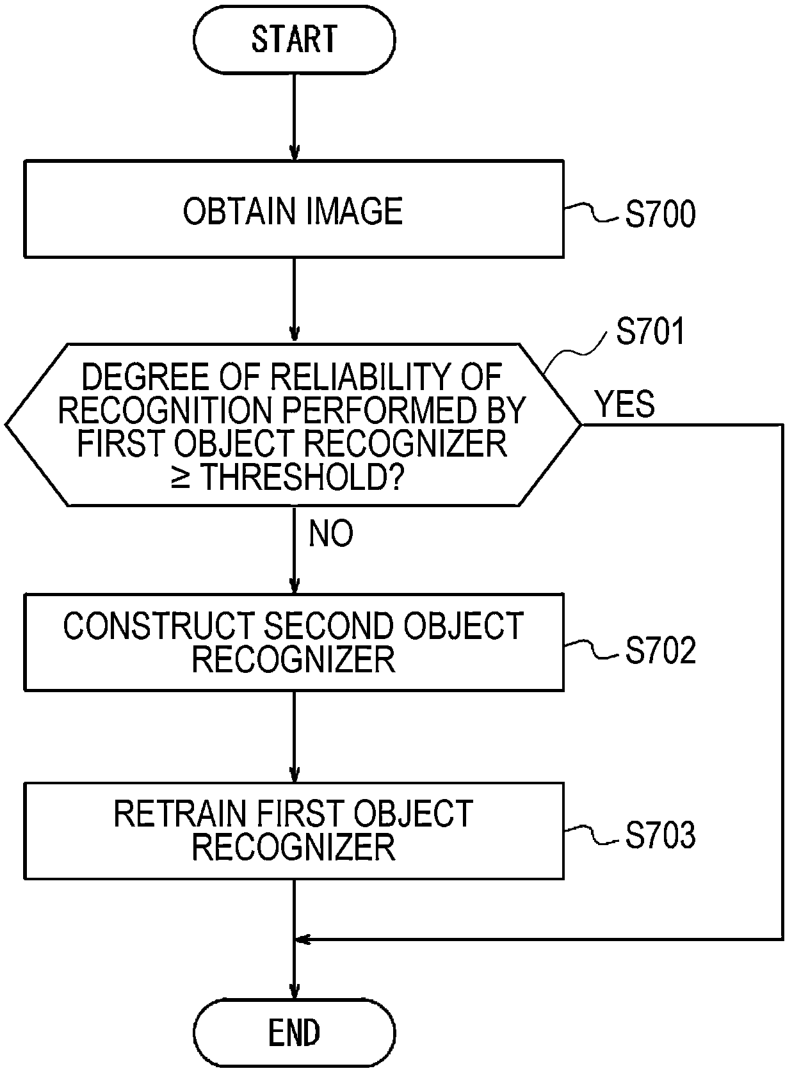
FIG. 12 is a flowchart illustrating a second retraining process performed by the control unit illustrated in FIG. 2 according to the second embodiment.

A second retraining process performed by the control unit 15 of the information processing apparatus 10 in the second embodiment instead of the first retraining process will be described with reference to a flowchart of FIG. 12. The second retraining process starts when the input unit 16 of the information processing apparatus 10 or the input unit 30 of the recognition device 26 detects an operation input for requesting the first retraining.

In step S700, the control unit 15 performs the same processing as in step S100 of the first retraining process according to the first embodiment. After an image is obtained, the process proceeds to step S701.

In step S701, the control unit 15 performs object recognition on a target included in the image obtained in step S700 using the first object recognizer. The control unit 15 also determines whether a degree of reliability of the object recognition is higher than or equal to a threshold. If so, the second retraining process ends. If not, the process proceeds to step S702.

In steps S702 and S703, the control unit 15 performs the same processing as in steps S103 and S104, respectively, of the first retraining process according to the first embodiment. After parameters for constructing the first object recognizer are transmitted to the terminal apparatuses 12 in step S703, the second retraining process ends.

In the second embodiment, if the first object recognizer capable of recognizing learned targets cannot recognize a target in an image obtained by the communication unit 14, the information processing apparatus 10 having the above-described configuration constructs a second object recognizer capable of recognizing the target in the image obtained by the communication unit 14 using the target without using the learned targets. Training time taken to retrain an existing first object recognition model using a target that has not been learned might become long. The information processing apparatus 10 having the above-described configuration for such an event can construct a second object recognizer for a target that cannot be recognized by the first object recognizer. Since the information processing apparatus 10 can construct a second object recognizer in shorter training time than for the first object recognizer, therefore, training time for an object recognizer capable of identifying a target that has not been learned can be reduced.

In the second embodiment, when the information processing apparatus 10 detects an operation input for starting to construct a second object recognizer, the information processing apparatus 10 newly constructs the second object recognizer. With this configuration, the information processing apparatus 10 can construct a second object recognizer for a target determined by the user to have not been learned.

In the second embodiment, the information processing apparatus 10 calculates a degree of reliability of recognition performed by the first object recognizer on a target included in an image obtained by the communication unit 14 and, if the degree of reliability is lower than or equal to a threshold, newly constructs a second object recognizer. With this configuration, the information processing apparatus 10 can determine whether a target included in an image obtained by the communication unit 14 has been learned even if whether the first object recognizer has already learned the target is not clear. The information processing apparatus 10, therefore, can automatically determine whether the first object recognizer has already learned the target and construct a second object recognizer without the user making the determination.

Although embodiments of the information processing apparatus 10 have been described, embodiments of the present disclosure may be implemented as a method or a program for achieving an apparatus, a storage medium storing the program (e.g., an optical disc, a magneto-optical disk, a CD-ROM, a CD-R, a CD-RW, a magnetic tape, a hard disk, a memory card, etc.).

The program is not limited to an application program such as an object code compiled by a compiler or a program code executed by an interpreter and may be implemented as a program module incorporated into an operating system or the like, instead. The program may or may not be configured such that a CPU on a control board solely performs all processing. The program may be configured such that another processing unit mounted on an expansion board or an expansion unit attached to a board performs part or the entirety of the program as necessary.

The drawings illustrating the embodiments of the present disclosure are schematic ones. Dimensions, ratios, and the like in the drawings do not necessarily match those in reality.

Although embodiments of the present disclosure have been described on the basis of the drawings and the examples, note that those skilled in the art can make various variations or alterations on the basis of the present disclosure. Note, therefore, that the scope of the present disclosure includes such variations or alterations. For example, the functions of each component or the like may be rearranged without causing a logical contradiction, and a plurality of components or the like may be combined together or further divided.

For example, in the first and second embodiments, the information processing apparatus 10 functions as a recognizer training apparatus, and the terminal apparatuses 12 each include a recognition device. The information processing apparatus 10, however, may function as a recognizer training apparatus and a recognition device, instead. With this configuration, for example, the terminal apparatuses 12 may transmit images generated by the imaging units 22 to the information processing apparatus 10 and receive results of recognition performed by the first object recognizer of the information processing apparatus 10. Alternatively, the terminal apparatuses 12 may transmit images generated by the imaging units 22 to the information processing apparatus 10 and receive results of recognition performed by the first object recognizer or the second object recognizer of the information processing apparatus 10.

All the elements described herein and/or all the methods disclosed herein or all the steps of the processes may be combined in any manner except for combinations where these features are mutually exclusive. Each of the features described herein may be replaced by an alternative feature that works for the same, equivalent, or similar purpose, unless explicitly denied. Each of the features disclosed herein, therefore, is just an example of a comprehensive series of the same or equivalent features, unless explicitly denied.

Embodiments of the present disclosure are not limited to any of the specific configurations according to the above-described embodiments. Embodiments of the present disclosure may be expanded to all the novel features described herein or combinations of these, all the novel methods described herein, or the steps of the processes or combinations of these.

Terms such as "first" and "second" in the present disclosure are identifiers for distinguishing the corresponding components. The components distinguished with the terms such as "first" and "second" in the present disclosure may exchange the numbers thereof. For example, the first object recognizer may exchange "first" for "second", which are identifiers, with the second object recognizer. The identifiers are simultaneously exchanged. Even after the exchange of the identifiers, the components are still distinguished from each other.

Identifiers may be removed. Components from which identifiers have been removed are distinguished from each other by reference numerals. The identifiers such as "first" and "second" in the present disclosure are not intended to be used as a sole basis for interpretation of order of the components or presence of an identifier with a smaller number.

REFERENCE SIGNS

10 recognizer training apparatus
11 information processing system
12 terminal apparatus
13 network
14 communication unit
15 control unit
16 input unit
17 memory
18 first object recognizer
19 stepwise determiner
20 top-layer determiner
21 lower-layer determiner
22 imaging unit
23 output device
24 platform
25 support pillar
26 recognition device
27 communication unit unit
28 storage unit
29 control unit
30 input unit

The invention claimed is:

1. A recognizer training apparatus comprising:
an obtainer configured to obtain an image; and
a controller configured to train a first object recognizer which consists of a plurality of stepwise determiners in a multilayer structure including a top-layer determiner and at least one lower-layer determiner and which recognizes a target in a captured image by classifying the target stepwise from a higher layer to a lower layer, the top-layer determiner classifying the target into a category among a plurality of categories, the at least one lower-layer determiner classifying the target in the category determined by a stepwise determiner in a higher layer into a lower category, wherein the controller is configured to:

determine whether the target is similar to any learned target among a plurality of learned targets already learned to be classified into the plurality of categories by the first object recognizer, in response to determining that the target is similar to a learned target among the plurality of learned targets, train the first object recognizer by causing the plurality of stepwise determiners to classify a target in the image obtained by the obtainer from a higher layer to a lower layer and adding a new lower category to a higher category corresponding to a lower-layer determiner that cannot classify the target into an existing lower category, and in response to determining that the target is not similar to the plurality of learned targets:

construct a second object recognizer configured to recognize the target without using the plurality of learned targets, and train the first object recognizer to recognize the target included using the target configured to be recognized by the second object recognizer and the plurality of learned targets configured to be recognized by the first object recognizer.

2. The recognizer training apparatus according to claim 1, further comprising:

an inputter is configured to detect an operation input for specifying the new lower category, wherein the controller is further configured to add the new lower category corresponding to the operation input detected by the inputter.

3. A recognition device comprising:

an obtainer configured to obtain a captured image;

a storage storing parameters for constructing the first object recognizer and the second object recognizer obtained from the recognizer training apparatus according to claim 1; and a controller configured to recognize a target included in the image using the first object recognizer and that, if the first object recognizer cannot recognize the target, recognizes the target using the second object recognizer.

4. A recognition device comprising:

an obtainer configured to obtain a captured image;

a storage storing parameters for constructing the first object recognizer and the second object recognizer obtained from the recognizer training apparatus according to claim 1; and a controller configured to recognize a target included in the image using both the first object recognizer and the second object recognizer and that employs a result of the recognition performed by the first object recognizer or the second object recognizer on a basis of degrees of reliability calculated for the recognition.

5. An electronic device comprising:

an imager configured to generate an image by capturing the image;

a storage storing parameters for constructing the first object recognizer which obtains the image captured by the imager from the recognizer training apparatus according to claim 1; and a communicator configured to transmit a target included in the image to a recognition device including a controller which performs recognition using the first object recognizer and that receives a result of the recognition of the image from the recognition device.

6. An electronic device comprising:

an imager configured to generate an image by capturing the image;

a storage storing parameters for constructing the first object recognizer and the second object recognizer which obtain the image captured by the imager from the recognizer training apparatus according to claim 1; and a communicator configured to transmit a target included in the image to a recognition device including a controller which recognizes the target included in the image and which, if the first object recognizer cannot recognize the target, recognizes the target using the second object recognizer and that receives a result of the recognition of the image from the recognition device.

7. A training method comprising:

obtaining an image; and training a plurality of stepwise determiners of a first object recognizer in a multilayer structure including a top-layer determiner and at least one lower-layer determiner, causing the plurality of stepwise determiners to classify a target in a captured image by classifying the target stepwise from a higher layer to a lower layer, and adding a new lower category to a higher category corresponding to a lower-layer determiner that cannot classify the target into an existing lower category among a plurality of categories, the top-layer determiner classifying the target into a category among the plurality of categories, the at least one lower-layer determiner classifying the target in the category determined by a stepwise determiner in a higher layer into a lower category, wherein training the plurality of stepwise determiners includes:

determining whether the target is similar to any learned target among a plurality of learned targets already learned to be classified into the plurality of categories by the first object recognizer, in response to determining that the target is similar to a learned target among the plurality of learned targets, training the first object recognizer by causing the plurality of stepwise determiners to classify the from the higher layer to the lower layer and adding the new lower category to the higher category corresponding to the lower-layer determiner that cannot classify the target into the existing lower category, and in response to determining that the target is not similar to the plurality of learned targets:

constructing a second object recognizer configured to recognize the target without using the plurality of learned targets, and training the first object recognizer to recognize the target included using the target configured to be recognized by the second object recognizer and the plurality of learned targets configured to be recognized by the first object recognizer.

8. The recognizer training apparatus according to claim 1, wherein the controller is configured to determine whether the target is similar to any learned target by comparing feature values of the target to feature values of the plurality of learned targets, the feature values of the target and the feature values of the plurality of learned targets including at least one of pixel values, histograms, and correlation coefficients.

* * * * *